Feb. 10, 1959  G. F. LAING  2,873,034
BICYCLE RACK
Filed Nov. 1, 1955

George F. Laing
INVENTOR.

United States Patent Office 2,873,034
Patented Feb. 10, 1959

2,873,034

BICYCLE RACK

George F. Laing, Brattleboro, Vt.

Application November 1, 1955, Serial No. 544,295

1 Claim. (Cl. 211—17)

The present invention relates to new and useful improvements in bicycle racks and has for its primary object to provide, in a manner as hereinafter set forth, novel means for firmly holding a plurality of bicycles in a standing or upright position in a relatively small area.

Another very important object of the invention is to provide a rack of the aforementioned character comprising slidably adjustable, swinging clamps or holders of a novel construction which may be readily engaged with or disengaged from the bicycles with a minimum of effort.

Other objects of the invention are to provide a bicycle rack of the character described which will be comparatively simple in construction, strong, durable, compact, highly efficient and reliable in use and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
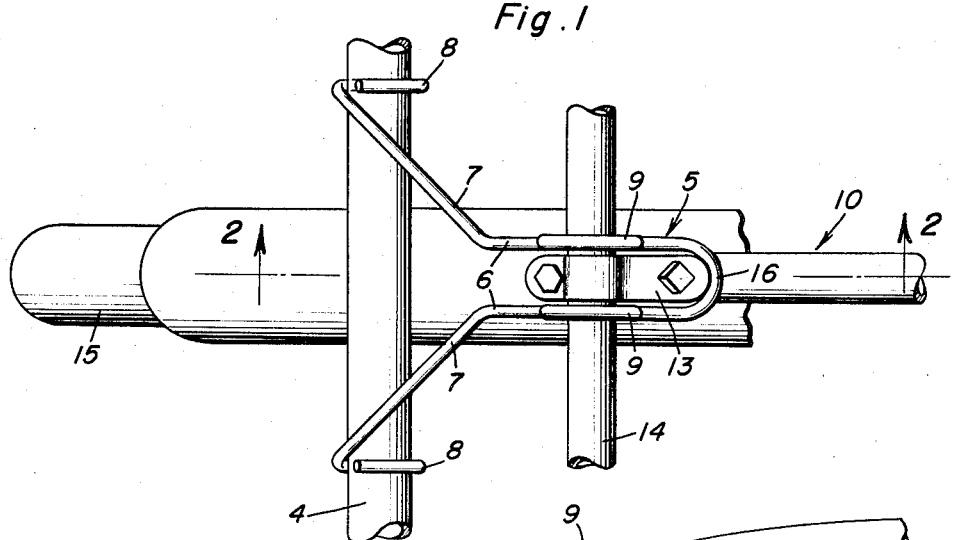
Figure 1 is a top plan view, showing the invention in use.
Figure 2:
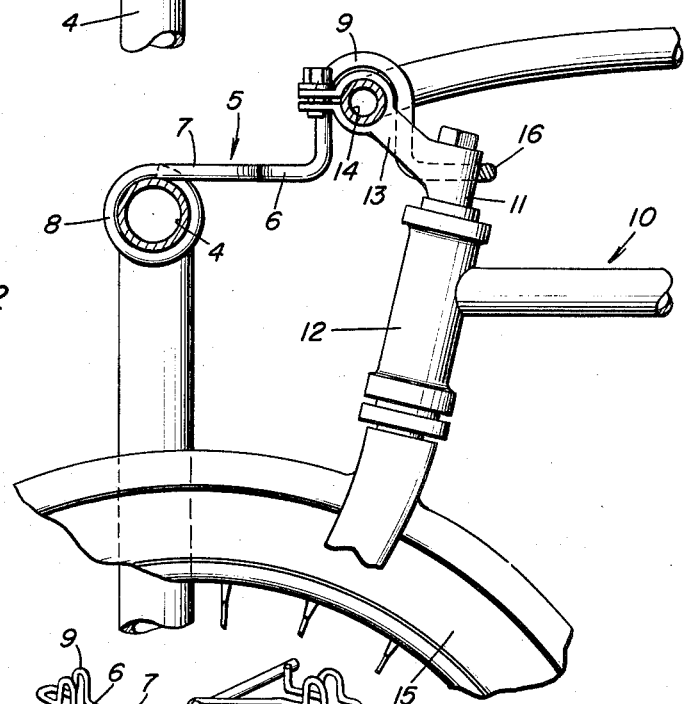
Figure 2 is a vertical sectional view, taken substantially on the line 2—2 of Figure 1.
Figure 3:
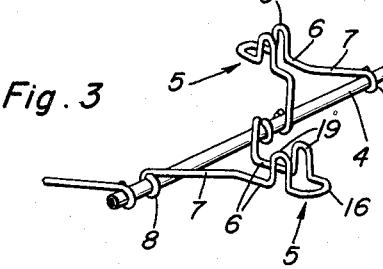
Figure 3 is a perspective view of the invention.

Referring now to the drawing in detail, it will be seen that the embodiment of the invention which has been illustrated comprises a horizontal tubular shaft 4 of suitable metal. The tubular shaft 4, which may be of any desired length and diameter, may be mounted on any suitable supports.

Mounted for sliding and swinging movement on the shaft 4 is a plurality of substantially U-shaped clamps or holders 5 of suitable resilient metal. The legs 6 of the holders 5 include divergent end portions 7 which terminate in loops or eyes 8 which are slidably journaled on the shaft 4. The legs 6 of the holders 5 further include, at an intermediate point, upstanding substantially U-shaped humps or loops 9, the purpose of which will be presently set forth.

It is thought that the operation or use of the rack will be readily apparent from a consideration of the foregoing. Briefly, any desired number of the holders 5 may be mounted on the shaft 4, said holders, when conditions permit, extending alternately in opposite directions from said shaft. A portion of a bicycle is designated generally by reference character 10, said bicycle including the usual post 11 journaled in the frame head 12 and having projecting forwardly and upwardly therefrom an arm 13 carrying the handle bar 14. The bicycle 10 is positioned adjacent the shaft 4 at right angles thereto with the front wheel 15 extending thereunder. To secure the bicycle 10 to the rack, one of the holders 5 is swung downwardly to engage the handle-bar 14 in the loops 9 adjacent opposite sides of the arm 13, the legs 6 of said holder straddling said arm. The bight portion 16 of the holder is engaged over the upper end portion of the post 11 thus completing the operation. The construction and arrangement is such as to firmly secure the bicycle in a standing position. Of course, to remove the bicycle the foregoing procedure is substantially reversed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A rack for bicycles of the type including a steering post, an arm on the upper end portion of the post and a handle bar mounted transversely on said arm, said rack comprising a horizontal shaft, and a substantially U-shaped holder of resilient wire journaled for swinging movement in a vertical plane on said shaft and engageable with the handle bar for supporting the bicycle in an upright position, said holder comprising spaced parallel legs including upstanding, substantially inverted U-shaped intermediate loops for transversely receiving the handle bar astraddle the arm, said holder further comprising a bight portion for embracing the post and engageable therebehind for stabilizing the holder on the handle bar and for anchoring the bicycle against rearward movement.

References Cited in the file of this patent

UNITED STATES PATENTS

| 621,819 | Ivatt | Mar. 28, 1899 |
| 997,858 | Savage | July 11, 1911 |
| 2,243,387 | Livingston | May 27, 1941 |

FOREIGN PATENTS

| 12,927 | Great Britain | of 1896 |
| 131,584 | Australia | Mar. 1, 1949 |
| 212,096 | Switzerland | Jan. 16, 1941 |
| 222,103 | Switzerland | Sept. 16, 1942 |